Patented Dec. 12, 1944

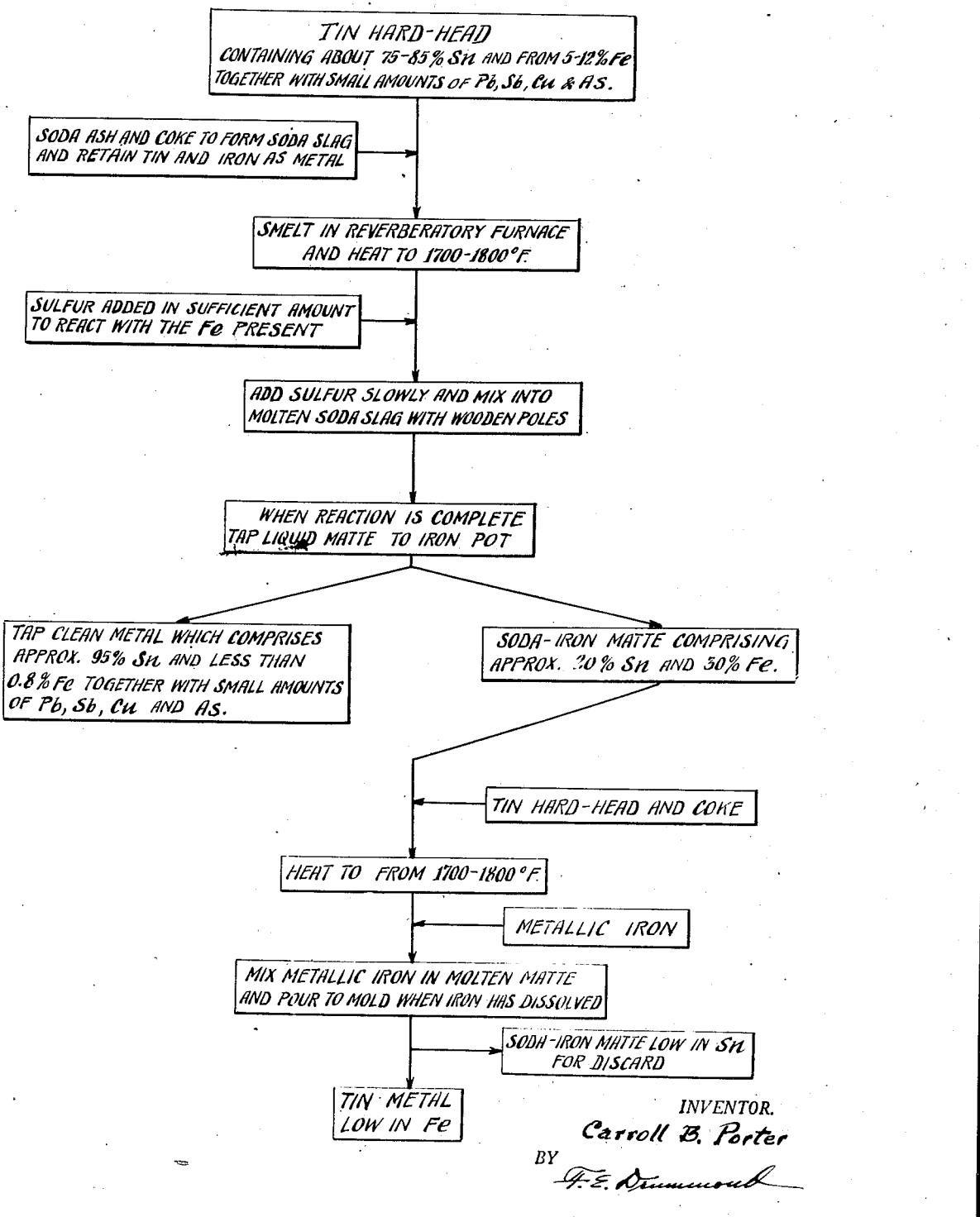

2,364,815

UNITED STATES PATENT OFFICE 2,364,815

METHOD OF TREATING TIN HARDHEAD TO RECOVER TIN

Carroll B. Porter, Metuchen, N. J., assignor to American Smelting and Refining Company, New York, N. Y., a corporation of New Jersey Application March 9, 1944, Serial No. 525,626

7 Claims. (Cl. 75—85)

This invention relates to the metallurgy of tin and more particularly to a process for treating iron-tin alloy like material commonly known as tin "hardhead" to recover the tin as tin metal substantially free of iron.

Intermetallic compounds of tin and iron which are conventionally referred to as tin hardhead have, prior to my invention, been extremely difficult to treat so as to separate the tin from the iron and recover the tin as relatively pure metallic tin. One method heretofore practiced for treating such intermetallic tin-iron substances comprises smelting the material with cassiterite low in Fe or an oxide of tin which is substantially free from iron whereby the iron in the tin-iron material is oxidized and separated as an oxide constituent. Another method sometimes practiced involves smelting the tin-iron material in a blast furnace along with oxides of lead. In the first instance losses of tin are relatively high and the recovery of purified tin is comparatively low. Utilizing the second method, the tin is debased with lead and only solder or similar alloys of lead and tin may be produced instead of the relatively pure tin metal which usually is of much greater value.

According to this invention a process is provided for refining tin hardhead which results in the recovery of the tin constituent as relatively pure metal low in iron and the production of a discardable slag low in tin and high in iron. The invention provides a relatively simple and efficient method for processing tin hardhead wherein it is unnecessary to introduce any metallic oxides of tin or lead.

The process is carried out by smelting the hardhead, with or without a reducing agent such as coke or the like carbonaceous substance—depending upon whether or not any appreciable amount of tin oxide is present or may be formed—along with a suitable cover fluxing slag, for example as produced by the addition of sodium carbonate or the like flux forming substance. The charge is smelted in a suitable furnace, preferably a reverberatory, sulphur being introduced in sufficient amount to react with the iron in the hardhead and form a soda-iron slag or matte.

To bring about this reaction the tin hardhead and slag forming materials are melted and when both hardhead and cover slag are heated high enough to be completely fluid, sulphur or equivalent sulphur supplying substance is intermixed with the molten charge in such a manner as to dissolve the sulphur in the cover slag and bring this soda-sulphur slag into intimate contact with the molten tin hardhead. In this way the iron in the hardhead reacts with the sulphur of the slag by virtue of the affinity of the soda-sulphur slag for iron. To bring the soda-sulphur slag into contact with the iron of the tin hardhead the molten mass may be mixed vigorously, as by stirring the molten charge with wooden poles, to mix the slag intimately with the molten hardhead.

After the molten charge has been reacted with sulphur, the soda-iron matte separates from the body of the molten metal mass by reason of its lower specific gravity floating on top of the purified tin metal and may be drawn off, skimmed or otherwise removed from the tin metal therebeneath so as to recover tin metal relatively free or very low in iron.

Although the novel features which are believed to be characteristic of this invention will be particularly pointed out in the claims appended hereto, the invention itself as to its objects and advantages, and manner in which it may be carried out, may be better understood by referring to the following description and accompanying drawing forming a part thereof, in which a flow sheet of the inventive process is shown.

In the following examples and claims specific terms and substances are used for descriptive purposes. However, it will be understood that in the use of such terms and expressions and in practicing my invention, equivalents are comprehended as within the scope of the invention disclosed and claimed.

According to one method and manner of practicing this invention tin hardhead analyzing approximately 8 to 12% iron is charged into a reverberatory furnace along with ½ to 1½% by weight of fine coke and about 8% by weight of soda ash. The charge is heated to a temperature of between 1600 and 1800° F. and, after the melt has become fluid, crushed sulphur is shoveled into the molten soda slag and the whole mass stirred with wooden poles. Stirring with wooden poles is preferred because of the vigorous mixing action produced but any other suitable stirring means may be employed. In some instances, where the conservation of sulphur is of no moment, no stirring may be necessary.

After sulphur amounting to from 8 to 12% of the weight of the tin hardhead has been introduced and thoroughly reacted the layer of soda-iron matte which floats on top of the melt is allowed to run from the furnace, being collected in a suitable receptacle. This soda-iron matte generally contains in the neighborhood of 30% iron and 20% tin and the tin metal of the melt ordinarily will contain about 1% or less of iron. After skimming the matte clean from the melt the tin metal may be drawn from the furnace and transferred to a kettle or pot for further refining and moulding for the trade or marketed without further refining.

The soda-iron matte which is too high in tin to be discarded is returned to the furnace along with a new charge of tin hardhead and heated until the entire charge is molten whereupon the melt is vigorously stirred with poles. This treatment causes the metallic iron in the hardhead to react with the tin sulphide in the original soda-iron matte forming iron sulphide releasing tin metal. The matte which is now low in tin is tapped from the furnace and may be discarded. Where the tin content of the matte is still too high to permit discarding of the matte it is re-smelted and metallic iron added to release more tin as illustrated by the drawing flow sheet.

As typical examples of how the process of my invention may be carried out the following are illustrative:

*Example I*

Tin hardhead amounting to 75 pounds containing 78% Sn and 7% Fe by weight was charged into a graphite crucible together with 9 pounds of soda ash and ½ pound of crushed coke. The charge was heated to about 1800° F. to form a melt. Thereafter 8 pounds of sulphur was mixed slowly into the molten mass and when the reaction was completed the soda-iron matte formed was skimmed off and the metal poured in a mold. The metal recovered weighed 57.8 pounds and analyzed 95% Sn and 1.1% Fe.

Soda-iron matte weighing 21.3 pounds was produced which analyzed 16.9% Sn and 21.6% Fe. To this matte was added 20 pounds of tin hardhead (78% Sn and 7% Fe) along with ½ pound of coke. The charge was then heated to approximately 1800° F. and after a fluid melt had been formed the melt was mixed thoroughly for about 10 minutes with a wooden pole. Thereafter the mass was poured into a mold and the matte and metal separated upon solidification of the mass. Tin metal weighing 18.4 pounds was recovered which analyzed 93.6% Sn and 1.8% Fe.

The matte formed by this treatment weighed approximately 21 pounds which analyzed 6.3% Sn and 27% Fe. To this soda-iron matte was added 10 pounds of tin hardhead (78% Sn and 7% Fe) along with ¼ pound of coke. The mixture of matte and hardhead was melted in a graphite crucible as before by heating to approximately 1800° F. Metallic iron amounting to 1½ pounds was then mixed into the melt and when the iron had dissolved the melt was poured into a mold and upon solidification the matte and metal were separated. The soda-iron matte produced weighed 19 pounds and assayed 3½% Sn and 29% Fe. This low tin content matte was discarded and the partially treated tin hardhead was returned to the process for treatment along with more hardhead material.

By adding sufficient metallic iron to the initially formed soda-iron matte the tin in the matte can be lowered so as to produce a final soda-iron matte low in tin and high in iron which can be discarded. Preferably, however, I first smelt this soda-iron matte with additional hardhead to release more of the tin and produce a soda-iron matte low enough in tin so that it may be discarded economically. If after this treatment the tin content of the soda-iron matte still amounts to more than about 5% it is smelted with additional metallic iron and/or hardhead to produce a matte which is sufficiently low in tin so that it may be thrown away.

*Example II*

In a large scale operation 27,419 pounds of tin hardhead analyzing 85% Sn and 7% Fe was smelted in a reverberatory furnace heated to about 1800° F. with 1600 pounds of soda ash and 700 pounds of coke. After a melt of metal and soda slag was formed 2,500 pounds of sulphur was mixed slowly into the molten soda slag, the melt being stirred with wooden poles. When the reaction was completed the liquid matte was drawn off into an iron pot and the relatively clean tin metal tapped from the furnace into a mould. The metal which weighed 20,587 pounds analyzed 94.82% Sn, 3.25% Pb, 0.65% Sb, 0.65% Fe, 0.35% Cu and 0.28% As. 5,500 pounds of soda-iron matte was produced. This matte which analyzed 21.3% Sn and 29.9% Fe was then re-smelted with more tin hardhead under reducing conditions to produce a soda-iron matte sufficiently low in tin so that the matte could be discarded and the cycle repeated starting with more tin hardhead.

It will be understood that the amounts of reactants used may differ somewhat with different batches. Ordinarily the amount of soda ash used will approximate 5 to 10% by weight of the tin hardhead and will depend upon the percentage of iron present in the hardhead. The amount of sulphur introduced may vary from about 8 to 12% of the weight of the tin hardhead and is preferably added in excess of the amount necessary to react with the iron present to form FeS which is soluble in the soda slag whereby substantially all of the iron originally in the hardhead will be found in the soda-slag layer and only 1% or less in the metallic tin forming the body of the melt. Although I prefer to introduce sulphur as such, if desired the sulphur may be added in the form of a compound such as sodium sulphate, tin sulpate or tin sulphide.

The amount of tin hardhead and/or metallic iron added to the original soda-iron matte to lower the tin content may vary depending upon the percentage of tin in the soda-iron matte. Inasmuch as the hardhead generally comprises from 5 to 12% by weight or iron in metallic form it is only necessary to add a relatively small amount of metallic iron. For example, when treating a soda-iron matte weighing 14 pounds and analyzing about 6% Sn and 16% Fe I smelt it with approximately 10 pounds of tin hardhead (78% Sn and 7% Fe) and 1½ pounds metallic iron under reducing atmospheric conditions to produce a waste soda-iron matte analyzing about 3½% Sn. Under optimum conditions this tin value may be still further decreased. Only a small amount of coke or the like carbonaceous substance is used to maintain reducing atmospheric conditions of the melt. Ordinarily coke in the amount of ½ to 2½% by weight of the hardhead is added depending upon the oxidized condition of the hardhead. Where no oxides are present or formed during the smelting operation the coke may be omitted. Usually however, a small amount of coke is added to the charge as a matter of precaution.

It will be seen from the foregoing that my invention provides a relatively simple and efficient method for refining tin hardhead and the like tin-iron metallics or alloys to recover tin metal substantially free or low in iron. Further it will be observed that the process described is adapted for use in treating tin-soda-iron mattes to reclaim tin therefrom as metallic tin with the production of a final discard product low in tin and high in iron.

What is claimed is:

1. A metallurgical process for treating tin hardhead to recover tin metal which comprises intermixing with tin hardhead 5 to 10% of sodium carbonate, 0.5 to 2.5% of coke and .8 to 12% of sulphur to form a smeltable charge, smelting the charge in a reverberatory furnace at smelting temperature whereby to produce a layer of matte in which substantially all iron in the melt will collect leaving a residual tin metal portion which comprises approximately 95% Sn, said tin metal containing less than 0.8% Fe and small amounts of other elements as impurities.

2. A metallurgical process for treating tin hardhead to recover tin metal comprising intermixing with tin hardhead a quantity of sodium carbonate up to 10%, a quantity of coke up to 2½% and a quantity of sulphur added in sufficient amount to convert the iron present in the hardhead to FeS, whereby to form a smeltable charge, smelting the charge in a reverberatory furnace below 1800° F. to produce a soda-iron matte layer in which substantially all the iron in the hardhead will collect in the form of FeS, and a residue of tin metal bullion wherein less than 1% iron is present as an impurity.

3. A metallurgical process which comprises intermixing with tin hardhead a quantity of sodium carbonate up to 10%, a quantity of coke up to 2½% and a quantity of sulphur added in sufficient amount to convert the iron present in the hardhead to FeS, whereby to form a smeltable charge, smelting the charge in a reverberatory furnace at smelting temperatures to produce a soda-iron matte in which substantially all of the iron will collect and a tin metal residue containing only a small amount of iron as an impurity, separating said matte and tin metal, and re-smelting said soda-iron matte with additional tin hardhead and coke to recover tin therefrom and produce a final discard product low in tin and high in iron.

4. A metallurgical process which comprises intermixing tin hardhead containing about 75 to 85% tin metal and from 5 to 12% metallic iron together with small amounts of impurities with soda ash and coke to form a soda slag in which FeS is soluble, smelting said mixture of tin hardhead, soda ash and coke in a reverberatory furnace and adding sulphur to the molten mass in an amount sufficient to react with all the iron present and form FeS whereby to produce a soda-iron matte layer in which substantially all the iron originally in the tin hardhead is collected and separating said soda-iron matte therefrom to recover tin metal which is substantially free of iron.

5. In a metallurgical process wherein tin-iron metallic material is smelted in the presence of sodium carbonate and a carbonaceous reducing agent as a flux, the step which comprises adding sulphur to the charge in an amount sufficient to react with the total iron present to form FeS which is soluble in the flux and floats on the surface of the melt whereby substantially all the iron in the original tin-iron material collects in the flux layer.

6. A metallurgical process which comprises intermixing with tin-iron metal material containing metallic tin and iron wherein the tin is the major constituent, a quantity of soda ash up to 10% and a quantity of coke up to 2½% and a quantity of sulphur added in sufficient amount to convert the iron constituent of the hardhead to FeS, whereby to form a smeltable charge, smelting the charge in a reverberatory furnace at smelting temperatures of between 1700 and 1800° F. to produce a soda-iron matte in which substantially all of the iron will collect leaving a tin metal portion which is of higher specific gravity than said matte containing about 1% or less iron as an impurity, separating said soda-iron matte from said tin metal portion, re-smelting said matte with additional hardhead and coke at a temperature between 1700 and 1800° F. to produce a molten mass and intermixing metallic iron with the molten mass and when the iron has reacted therewith thereafter separating the matte from the tin metal to recover tin metal low in iron and produce a soda-iron matte containing less than 5% tin.

7. A metallurgical process which comprises intermixing tin hardhead with soda ash and coke to form a smeltable charge having a covering soda slag, smelting the charge in a reverberatory furnace at smelting temperatures to produce a melt with a soda slag covering matte, intermixing sulphur with the molten charge and stirring the molten mass with wooden poles until the reaction of the sulphur with the molten charge is complete, said sulphur being added in sufficient amount to react with all the iron originally present in the tin hardhead and produce a soda-iron matte layer in which substantially all the iron in the charge is collected, separating said soda-iron matte from the tin metal portion of the melt, re-smelting the soda-iron matte thus separated with additional tin hardhead and coke at smelting temperatures and introducing metallic iron in sufficient amount to react with any unreacted tin sulphide present to remove more tin as metal from said soda-iron matte and produce a final soda-iron matte lower in tin than in the original soda-iron matte, separating this low-tin soda-iron matter from the tin metal portion of the melt to recover said tin metal as tin metal bullion low in iron.

CARROLL B. PORTER.